United States Patent [19]
Lenti et al.

[11] Patent Number: 5,858,467
[45] Date of Patent: Jan. 12, 1999

[54] PREPARATION OF AQUEOUS COMPOSITIONS BASED ON FLUOROELASTOMERS FOR COATINGS HAVING A HIGH THICKNESS

[75] Inventors: Daria Lenti, Valenza Po; Tiziana Poggio, Montechiaro d'Acqui; Luciano Masini, Spinetta Marengo, all of Italy

[73] Assignee: Ausimont S. p. A., Italy

[21] Appl. No.: 588,692

[22] Filed: Jan. 19, 1996

Related U.S. Application Data

[63] Continuation of Ser. No. 273,324, Jul. 11, 1994, abandoned.

[30] Foreign Application Priority Data

Jul. 16, 1993 [IT] Italy .................. MI93A1569

[51] Int. Cl.$^6$ ....................................... B32B 15/00
[52] U.S. Cl. ............................................. 427/385.5
[58] Field of Search ................... 524/545, 546; 427/385.5

[56] References Cited

U.S. PATENT DOCUMENTS

| | | | |
|---|---|---|---|
| 3,900,654 | 8/1975 | Stinger | 428/214 |
| 4,259,463 | 3/1981 | Moggi et al. | 525/331 |
| 4,339,553 | 7/1982 | Yoshimura et al. | 524/544 |
| 4,618,641 | 10/1986 | Hengel | 524/284 |
| 4,914,158 | 4/1990 | Yoshimura et al. | 525/199 |
| 5,264,509 | 11/1993 | Arcella et al. | 526/247 |

FOREIGN PATENT DOCUMENTS

A-2258685  12/1974  France.

*Primary Examiner*—Peter D. Mulcahy
*Attorney, Agent, or Firm*—Finnegan, Henderson, Farabow, Garrett & Dunner, L. L. P.

[57] ABSTRACT

Method of preparation of concentrated aqueous compositions based on fluoroelastomers, capable of giving a coating having a high thickness for each passage on the surface to be protected, consisting in the milling of the additives at the powder state directly into the latex of the fluoroelastomer.

15 Claims, No Drawings

PREPARATION OF AQUEOUS COMPOSITIONS BASED ON FLUOROELASTOMERS FOR COATINGS HAVING A HIGH THICKNESS

This application is a continuation of application Ser. No. 08/273,324, filed Jul. 11, 1994, now abandoned.

The present invention relates to a process for preparing aqueous compositions having high stability based on fluoroelastomer usable with conventional painting techniques for making protective coatings having high resistance and high thickness after only one passage on the surface to be coated, generally of metal or rubber.

The fluoroelastomers are characterized by an intrinsic chemical inertia at high temperatures and therefore are broadly usable in fields where a remarkable resistance to the chemical agents is required, as for instance in the chemical, petrochemical or car industry. The coating with a paint based on fluoroelastomer confers to the surface of the coated object the same characteristics of resistance to the chemical agents as those of the fluoroelastomer itself.

Various formulations of fluoroelastomers based on the use of a solvent are described in the art. A typical formulation comprises the polymer, a solvent, selected charges for their reinforcing effect and for their capacity of conferring suitable rheological properties to the paint, an acceptor of hydrofluoric acid, usually selected from the metal oxides, and a crosslinking agent, often as a separate component, to develop in the coating good mechanical properties. The method of preparing the compositions consists in solubilizing the fluoroelastomer and dispersing in the obtained solution the charges, optionally premilled with a part of the solution itself.

The formulations of fluoroelastomers based on a solvent show various inconveniences. The high dilution of the system, bound to the limited solubility of the fluoroelastomer in organic solvents (methylethylketone, acetone, butyl acetate, tetrahydrofurane) requires the application of many layers to obtain a high thickness, of about 1 mm, necessary in particular in the anticorrosion coatings. This inconvenience is particularly felt considering that the spray application of compositions with low dry content and high viscosity requires a special technique and in any case it does not give a layer having thickness higher than 100 $\mu$m in a single coat. The amount of solvent which is required is rather high, around 5 kg per 1 kg of fluoroelastomer. Moreover the need to solubilize the fluoroelastomer in a solvent limits the choice of the fluoroelastomer itself to polymers with low molecular weight. At last, the "shelf life" and the "pot life" of the compositions result rather short, especially in the case of bicomponent systems.

All these drawbacks have therefore led to the development of water systems, described in particular in the U.S. Pat. Nos. 4,339,553 and 4,618,641, based on the crosslinking of fluoroelastomers in aqueous dispersion in the presence of an amine compound. The method of preparation described in U.S. Pat. No. 4,339,553 implies the mere mixing of the fluoroelastomer latex with the pigments and the other charges usually utilized in compositions of this type. The preparation method described in U.S. Pat. No. 4,618,641 implies the predispersion of pigments and of charges before the addition to the latex. Both these processes lead on the one hand to compositions which, though having a relatively high content in solid substance, need several coats to obtain a film of high thickness, necessary in particular to supply a suitable anticorrosion protection, without formation of the sagging, and on the other hand imply the addition of a considerable amount of additives tending to increase the hydrophily of the coating, limiting therefore its chemical resistance. Moreover, water compositions prepared by the methods described, have a stability that, though better than the one of the compositions containing solvent, generally is still rather low.

Now it has been surprisingly found a process allowing to prepare aqueous compositions based on fluoro elastomers not showing the above described problems, having a high content in solid and providing a film with high chemical resistance, in particular to acids and to oils, and of high thickness with only one coat without sagging. The process which is object of the invention, operatively simpler than the ones described in the art, implies direct mixing of a concentrated aqueous latex of the fluoroelastomer with the other components of the formulation in their original physical form, generally as a dry powder, and milling and finely dispersing these components in the latex.

Contrary to what generally deemed by people skilled in the latexes field, it has been surprisingly found that it is possible to prepare an aqueous composition based on fluoroelastomer by milling and dispersing the inorganic charges, pigments and the additives directly into the concentrated aqueous latex of the fluoroelastomer, for instance by a microball mill working at high rate, without further addition of surface-active agents, dispersants or antisediment agents. By so working one succeeds in suitably combining the dispersing action with the milling action consequent to the application of a shearing stress. The surprising effect is the obtainment with the process object of the present invention of a stable aqueous composition, applicable with the conventional techniques, notwithstanding rather high viscosity values, such as air spray, spray without air, immersion, brush. In order to make a comparison, the properties and the performances of a composition obtained by the process of the invention and the ones of a corresponding composition prepared by conventional techniques have been evaluated. According to an alternative of the process of the present invention, milling and dispersing of the components can be carried out by utilizing in this stage only a part of the latex amount in the final composition, the remaining part being added after the milling. More concentrated pastes are so obtained which can be subsequently diluted.

The compositions prepared according to the invention can be applied to various materials, in particular metals, in order to supply an anticorrosion protection, and rubbers, to protect them from the attack of acids, oils and solvents. The compositions can be utilized for impregnating fabrics.

The choice of the "primer" is very broad, such compositions being compatible with different classes of solvent or water "primers", such as epoxides, acrylilates and urethanes. The adhesion to rubbers (in particular polycloroprene, NBR rubbers, EPDM rubbers) is assured from the use of adhesives such as for instance the elastomeric epoxy resins crosslinked with polyaminoamides.

The fluoroelastomers included in the compositions obtainable by the process of the present invention are preferably the ones known as Tecnoflon®, formed by vinylidenfluoride and hexafluoropropene copolymers and optionally by one or more different monomers, suitable to confer particular properties to the elastomer, such as for instance tetrafluoroethylene, perfluoro(alkylvinylethers), 1-hydropentafluoropropene, chlorotrifluoroethylene and the olefins having up to 4 carbon atoms. The most preferred fluoroelastomers are the terpolymers formed by vinylidenfluoride, hexafluoropropene and tetrafluoroethylene and the terpolymers formed by vinylidenfluoride, hexafluoropropene and perfluoro(methylvinylether). More preferred are also the fluoroelastomers described in the Italian patent applicatioan MI 91 A 001339 having particular mechanical properties besides a high resistance to chemical agents and at low temperatures, comprising by moles:

4–75% of vinylidenfluoride units;

12–40% of hexafluoropropene and/or perfluoro (alkylvinylether) and/or perfluoro (alkoxyalkylvinylether) and/or 1-hydropentafluoropropene and/or chlorotrifluoroethylene units;

2–35% of units of an olefin containing up to 4 carbon atoms;

2–60% of tetrafluoroethylene units.

The fluoroelastomer utilized in the compositions obtainable by the process of the present invention must be in the form of concentrated aqueous dispersion and formed by colloidal particles of submicron sizes, preferably with a content in fluoroelastomer higher than 50% by weight with respect to the total weight of the dispersion, even more preferably with a content in fluoroelastomer comprised between 60 and 70% by weight with respect to the total weight of the dispersion. Such a concentrated dispersion can be obtained from a dispersion directly originating from the polymerization process with a process comprising the addition of a non-ionic surface active agent, the heating of the dispersion at the cloud temperature and its maintenance at this temperature for a certain time, generally one hour, and at last the decantation and separation of a concentrated phase having generally an overall concentration comprised between 60 and 70% by weight and a content in surface active agent of 3–4% by weight.

The advantage of the employment of a latex instead of a solution is bound to the possibility of utilizing polymers having high molecular weight and high content in fluorine, intrinsically with high chemical inertia and limited solubility in the preparation conditions of solutions of the copolymers with low molecular weight.

The crosslinking of the fluoroelastomers can be obtained with agents of various type, in particular with amino compounds. Polyfunctional amines, preferably triethylenetetramine and polyetherdiamines, can be employed. The polyhydroxylated compounds, both aromatic, such as for instance bisphenol A, and aliphatic or alicyclic, in the presence of an aminophosphinic accelerator of the type described in U.S. Pat. No. 4,259,463, are also preferred. All the above crosslinking agents can be added to the composition during the preparation, obtaining a monocomponent system, preferable to the bicomponent systems usually used in the compositions based on solvent. Many problems due to a reduced "pot life" or "shelf life", typical of the two components systems are overcome in this way. If the crosslinking agent is an amino compound, this can be added directly to the composition as the fluoroelastomer does not crosslinks until the same amine is in protonated form and therefore till the complete evaporation of the water forming the continuous medium of the composition. The amount of the crosslinking agent ranges, in the case of the amino crosslinking, from 0.1 to 20 parts by weight with respect to 100 parts of dry fluoroelastomer.

The amine amount is optimized on the basis of its hydrophile chartacteristics; a large amount of a highly hydrophilic amine can in fact lead to a film with a greater affinity to water and therefore less resistant. Compositions containing a polyfunctional amine, in particular selected from polyethylenamines and polyetherdiamines, in concentration comprised between 1 and 10 parts by weight with respect to 100 parts of dry fluoroelastomer, are preferred.

The choice of the crosslinking agent affects the crosslinking conditions of the coating. In the case of polyfunctional amines, if a polyethylenamine or a polyetherdiamine is used, crosslinking generally requires a heat treatment of the coated article, for instance at about 120° C. for a period of 24 hours. If, on the contrary, a more reactive polyamine is used, crosslinking can occur even leaving the object at room temperature or, at any rate, at a temperature comprised between 10° and 40° C., in a period of some days.

Polyamines allowing crosslinking at room temperature are for instance the dipropylentriamine, the 1,4-bis-(aminopropyl)-piperazine, alkylamines, the isophoronediamine, the meta-xylenediamine, the polyoxypropylenetriamine. In particular with the dipropylenetriamine and with the 1,4-bis-(aminopropyl)-piperazine, monocomponent paints with "shelf life" longer than 3 months are obtained, while the polyoxypropylenetriamine and some alkylamines, more reactive, need to be added to the formulation before the application, giving rise to bicomponent systems with "pot life" comprised between 2 and 10 days.

Crosslinking progress can be followed by swelling tests carried out using methylethylketone as solvent of the elastomer. The crosslinked coating is swollen, maintaining however the properties of a continuous film. On the contrary, if crosslinking is not sufficient, the solvent is able to dissolve the polymer giving rise to release of the charges or also to complete dissolution of the coating itself. By comparing the behaviour of films crosslinked at room temperature using the above indicated amines with that of films crosslinked at 120° C., for instance with triethylenetetramine, a higher crosslinking degree is generally noticed.

The inorganic or organic charges serve to modulate the mechanical properties of the coating and the rheological properties of the composition for the application at high thicknesses, of interest for the purposes of the present invention. The inorganic charges preferably utilized in the compositions prepared according to the present invention are formed by carbon black, silica, kaolin, mica, talc, clay, inorganic pigments in a total amount comprised between 5 and 50 parts by weight with respect to 100 parts of dry fluoroelastomer. Other inorganic charges, also specific for anticorrosion, can be employed in the compositions prepared according to the present invention.

The organic charges are essentially polymers. A preferred organic charge is polytetrafluoroethylene, endowed with high hydrophobicity which is added to increase the hydrophobicity and the chemical resistance of the coating obtained from compositions prepared according to the present invention. The polytetrafluoroethylene is preferably mixed to the fluoroelastomer latex in the form of concentrated latex in dry amount comprised between 1 and 10% by weight with respect to the dry weight of the fluoroelastomer.

In order to obtain coatings having high chemical resistance, the whole concentration of the charges is preferably maintained in a range comprised between 10 and 30 parts by weight with respect to 100 parts of dry fluoroelastomer.

The preparation of the compositions according to the method of the present invention implies the direct addition to the concentrated fluoroelastomer latex of components in their original physical form of dry powder, of liquid or dispersion and the dispersion thereof with high rate milling systems, such as for instance the milling with microballs mills. In the latter case the microballs of the mill preferably have an average diameter comprised between 0.5 and 3 mm and take up an apparent volume comprised between 40 and 80% of the milling room, while the mill rotation rate is preferably comprised between 1,000 and 3,000 rpm. The time required for such an operation is of a few minutes, generally comprised between 5 and 40 minutes.

A practical method to determine the optimum time of milling implies the drawing of samples of the composition and the determination of their viscosity after a period of rest of some hours, necessary to let the foam disappear. The optimum milling time corresponds to the one of the samples in which the viscosity has reached a high value but it has not yet started to decrease.

The method according to the invention shows a clear advantage with respect to the traditional method involving the predispersion of the charges, as it allows to eliminate the addition of additives such as surface-active agents, dispersants and antisedimention agents necessary in said predispersion. Owing to their hydrophilic character such additives increase the affinity of the coating for water and limit the chemical resistance thereof since the water can act as vehicle for the inlet of corrosion agents in the coating itself. This is confirmed by the comparison of the performances of two compositions one prepared by the traditional method, the other one by the claimed method. In the former case the predispersion of the charges requires the addition of considerable amounts of ionic surface-active agent (about 4–5%) and of an antifoam agent, in the latter case the dispersion of the charges occurs without addition of surface-active agents and with a lower amount of antifoam agent. In the former case, moreover, the rheology of the system allows at most the application of about 100 μm of dry film, while in the latter case dry films of 300–400 μm are obtained. A further advantage of the method according to the invention is formed by the lower dilution of the system as all the charges are added as powders. This advantage allows sometimes to achieve the desired thickness of the coating in one single coat and leads however to a shorter application cycle to obtain the high thickness required by the applications in anticorrosion (about 1 mm or more).

The dry content obtainable in the coating compositions by the process of the present invention is generally at least 65% by weight with respect to the total weight of the composition. The dispersion obtained after milling generally shows a viscosity comprised between 20 and 180" Ford Cup 4 (method ASTM D 1200/82) and can be applied with the conventional techniques, such as air spraying, spraying without air, immersion and brushing without being diluted.

The examples reported below are given only for illustrative purposes, but are not limitative of the present invention. Examples 1, 7, 9, 10, 11 and 12 are comparative examples; Example 1 explains the behaviour of a composition of the art based on the use of a solvent, example 7 explains the behaviour of a composition obtained by utilizing the known method of the predispersion of the components, examples from 9 to 12 show how the process of the invention does not result applicable to the preparation of compositions based on the use of latexes different from the fluoroelastomer ones.

EXAMPLE 1

(solvent based composition for comparison)

In this example it is tested the behaviour of a commercial product based on fluoroelastomer and on the use of a solvent, of the bicomponent type (Fluopast® D2400, Carboline), so made:

| Component A: | |
|---|---|
| Viton (terpolymer VDF/HFP/TFE = 66/20/14 by moles) | 8% |
| PTFE | 12.75% |
| inorganic charges | 4.25% |
| solvent (butylacetate + methylethylketone) | 75% |
| Component B: crosslinking agent (triethylenetetramine in solvent) | |
| "Pot life" of the mixture A + B at 24° C.: | 6 hrs. |

The composition is applied on sandblasted steel sheet by air spraying (4 atm pressure, 1.2 mm nozzle), succeeding to apply a moist film about 300 μm thick for passage. After drying at least 8 hours at room temperature it is possible to re-paint the test piece.

Six subsequent passages are required to obtain a thickness of the final dry film of 500 μm. The complete crosslinking of the test piece is obtained after 7 days at room temperature.

The chemical resistance properties of the film were tested in cell AT-LAB (ASTM C868) with sulphuric acid at 30% at 60° C., exposing the test piece partly to the liquid acid and partly to the vapour. After 30 days of exposure the film shows a light blistering on the part exposed to the vapour, while no alteration can be found for the part exposed to the acid solution.

EXAMPLE 2

A fluoroelastomer latex (Tecnoflon® TN, terpolymer vinylidenfluoride/hexafluoropropene/tetrafluoroethylene having the ratios between monomeric units 65/19/16 by moles) is concentrated by the following method. To 3 kg of a latex containing 35% by weight of solid, 600 ml of a 25% by weight "Triton® X 100" solution (non ionic surface-active agent marketed by Rohm & Haas) are added, corresponding to a content of 5% by weight on the dispersion. The pH is adjusted to 7 by adding a NaOH solution having 100 g/l concentration. The latex is heated to 63° C., corresponding to the "cloud point" temperature of the supernatant which separates during the heating, keeping such a temperature for about one hour. When the heating is over, the separation of a concentrated polymer phase having 67% by weight of total solid and containing about 4% of surface-active agent is obtained. This concentrated dispersion is utilized for the preparation of the composition described hereinunder by a microballs mill Fryma Maschinen AG Mod. MSM-12, the milling room of which has a capacity of about 500 ml.

The mill is let work continuously, milling about one kg of paint with a milling charge of about 300 ml formed by steatite small balls having a diameter of about 1–1.5 mm. The composition is prepared by adding the following components (phr=rubber percent) at the same time and as such:

| | |
|---|---|
| fluoroelastomer latex (67% by weight) | 725.9 g (100 phr) |
| polytetrafluoroethylene latex (69% by weight) | 37.0 g (6.1 phr) |
| kaolin (average size about 1.5 μm) | 67.9 g (14 phr) |
| zinc oxide | 36.6 g (7.5 phr) |
| carbon black | 14.7 g (3 phr) |
| silica ($S_{BET}$ 100 m$^2$/g) | 5.8 g (1.2 phr) |
| attapulgite ($S_{BET}$ 150 m$^2$/g) | 4.9 g (1 phr) |
| antifoam BYK 033 (Byk Chemie) | 8.2 g (1.7 phr) |
| water | 94.4 g |
| triethylenetetramine | 4.9 g (1 phr) |

The total solid content is 65.4% by weight. Two passages through the mill, with a stay time between 2 and 5 minutes, are sufficient to obtain a dispersion at the highest degree Heggman (about 5 μm) having viscosity corresponding to 60" Ford Cup 4.

EXAMPLE 3

On a sandblasted steel sheet, degreased with toluene and acetone, a "primer" having the following composition is sprayed:

| | |
|---|---|
| epoxy resin Eurepox ® 756/67 (Schering) | 17 g |
| polyaminoamidic crosslinking agent XE 435 (Schering) | 14 g |
| water | 69 g |

After drying of the "primer" in the air for about 8 hours, the composition described in Example 2 is sprayed on the sample. It is possible to apply the composition up to a maximum thickness of about 500 μm of moist film for passage, without any sagging being noticed. After drying about two hours in the air it is possible to repaint the test piece; then three additional layers of the composition are applied up to a total thickness of the dried film of about 900–1000 μm is achieved.

The cycle of drying and crosslinking comprises: drying at room temperature for 24 hours, drying at 60° C. for 5 hours, gradual rise of the temperature up to 120° C. and crosslinking at this temperature for 24 hours.

The chemical resistance properties of the film have been evaluated by exposition in cell AT-LAB (ASTM C868) to 30% by weight sulphuric acid, keeping the temperature at 60° C., in these conditions the test piece is exposed half to the liquid acid and half to the vapour. The comparison among the adhesion properties before and after exposure is an indication of the barrier properties of the coating. After 40 days the adhesion is unchanged and no effect of interlayer delamination is noticed.

The same composition is applied with the same modalities on a test piece of polished aluminium, degreased with toluene and acetone and crosslinked under the described conditions. The coating is then removed and characterized from the point of view of the mechanical properties by measuring a tensile stress of 7 MPa and a percentage elongation of 120%. A part of the film is immersed in 98% by weight sulphuric acid at 80° C. in order to evaluate the possible interlayer delamination; after 8 days the film is quite whole without showing delamination.

EXAMPLE 4

The concentrated dispersion of fluoroelastomer obtained with the procedure described in Example 2 is utilized for preparing the composition described hereinunder by a microballs mill Fryma Maschinen AG Mod. MSM-12, the milling room of which has a capacity of about 500 ml.

The mill is let work continuously by milling about one kg of paint with a milling charge of about 300 ml formed by steatite small balls having a diameter of about 1–1.5 mm. The composition is prepared by adding the following components at the same time and as such:

| | |
|---|---|
| fluoroelastomer latex (67% by weight) | 726.3 g (100 phr) |
| polytetrafluoroethylene latex (69% by weight) | 37.1 g (5.2 phr) |
| kaolin (average size about 1.5 μm) | 68.0 g (14 phr) |
| zinc oxide | 36.3 g (7.5 phr) |
| carbon black | 14.8 g (3 phr) |

-continued

| | |
|---|---|
| silica ($S_{BET}$ 100 m$^2$/g) | 8.7 g (1.8 phr) |
| attapulgite ($S_{BET}$ 150 m$^2$/g) | 7.3 g (1.5 phr) |
| antifoam BYK 033 (Byk Chemie) | 17.3 g (3.6 phr) |
| water | 86.9 g |
| triethylentetramine | 4.8 g (1 phr). |

The total solid content is 66.9% by weight. Two passages through the mill, with a stay time between 2 and 5 minutes, are sufficient to obtain a dispersion at the highest degree Heggman (about 5 μm) having viscosity corresponding to 150" Ford Cup 4.

EXAMPLE 5

On a sandblasted steel sheet, degreased with toluene and acetone, a "primer" having the following composition is sprayed:

| | |
|---|---|
| epoxy resin Eurepox ® 756/67 (Schering) | 17 g |
| polyaminoamidic crosslinking agent XE 435 (Schering) | 14 g |
| water | 69 g |

After drying of the "primer" in the air for about 8 hours, the composition described in Example 4 is sprayed on the sample. It is possible to apply the composition up to a maximum thickness of about 600 or more μm of moist film for passage, without any sagging being noticed. After drying about two hours in the air it is possible to repaint the test piece; two additional layers of the composition are then applied up to a total thickness of the dried film of about 900–1000 μm is achieved.

The cycle of drying and crosslinking comprises: drying at room temperature for 24 hours, drying at 60° C. for 5 hours, gradual rise of the temperature up to 120° C. and crosslinking at this temperature for 24 hours.

The chemical resistance properties of the film have been evaluated by exposition in cell AT-LAB (ASTM C868) to 30% by weight sulphuric acid, keeping the temperature at 60° C., in these conditions the test piece is exposed half to the liquid acid and half to the vapour. The comparison among the adhesion properties before and after exposure is an indication of the barrier properties of the coating. After 40 days the adhesion is unchanged and no effect of interlayer delamination is noticed.

The same composition is applied with the same modalities on a test piece of polished aluminium, degreased with toluene and acetone and crosslinked in the described conditions. The coating is then removed and characterized from the point of view of the mechanical properties by measuring a tensile stress of 7 MPa and a percentage elongation of 120% (method ASTM D 882). A part of the film is immersed in 98% by weight sulphuric acid at 80° C. in order to evaluate the possible interlayer delamination; after 8 days the film is quite whole without showing delamination. Another part of the film is immersed in water at 60° C. and the weight variation accompanying the swelling in the period of time is measured; after 3 days the weight variation is 4%, after 5 days is 6%, after 15 days it remains unchanged at 6%.

EXAMPLE 6

The concentrated dispersion of fluoroelastomer obtained with the procedure described in Example 2 is utilized for preparing the composition described hereinunder by a microballs mill Fryma Maschinen AG Mod. MSM-12, the milling room of which has a capacity of about 500 ml.

The mill is let work continuously by milling about one kg of paint with a milling charge of about 300 ml formed by steatite small balls having a diameter of about 1–1.5 mm. The composition is prepared by adding the following components at the same time and as such:

| | |
|---|---|
| fluoroelastomer latex (67% by weight) | 725.9 g (100 phr) |
| polytetrafluoroethylene latex (69% by weight) | 37.0 g (6.1 phr) |
| kaolin (average size about 1.5 μm) | 67.9 g (14 phr) |
| zinc oxide | 36.6 g (7.5 phr) |
| carbon black | 14.7 g (3 phr) |
| silica ($S_{BET}$ 100 m$^2$/g) | 5.8 g (1.2 phr) |
| attapulgite ($S_{BET}$ 150 m$^2$/g) | 4.9 g (1 phr) |
| antifoam BYK 033 (Byk Chemie) | 8.2 g (1.7 phr) |
| water | 94.4 g |
| Jeffamina ® D230 (polyoxypropylenediamine produced by Texaco Inc.) | 4.8 g (1 phr). |

The total solid content is 65.4% by weight. Two passages through the mill, with a stay time between 2 and 5 minutes, are sufficient to obtain a dispersion at the highest degree Heggman (about 5 μm) having viscosity corresponding to 60" Ford Cup 4.

The chemical resistance of the film has been tested in oils ASTM 3 and 5 at 150° C., evaluating the swelling at the equilibrium: the variation by volume was lower than 0.2% with oil ASTM 3 and lower than 0.3% with oil ASTM 5.

EXAMPLE 7

(comparison with Example 2)

A composition obtained by using the method of the predispersion of the components is evaluated, and compared to a composition similar to the one described in Example 2.

The following dispersions are initially prepared:

(a) Dispersion of zinc oxide:
  300 g of water, 200 g of zinc oxide, 2 g of sodium dodecylsulphate and 3 g of antifoam BYK 033;
(b) Dispersion of carbon black:
  110 g of water, 120 g of carbon black and 6 g of sodium dodecylsulphate.

In both cases the components are loaded in a ball mill (jar with capacity of about 1 l and milling charge formed by steatite small balls having a diameter of about 1 cm; ratio product to be milled/milling charge by volume equal to about 1) and milled for 48 hours.

The stable dispersions so obtained are then added to the fluoroelastomer latex, concentrated together with the other components as described in Example 2, in order to obtain the following formulation:

| | |
|---|---|
| fluoroelastomer | 100 phr |
| silica ($S_{BET}$ 100 m$^2$/g) | 1.2 phr |
| attapulgite ($S_{BET}$ 150 m$^2$/g) | 1 phr |
| kaolin | 17 phr |
| zinc oxide | 8.5 phr |
| carbon black | 4.3 phr |
| triethylentetramine | 1.5 phr. |

On a sandblasted steel sheet, degreased with toluene and acetone, a "primer" having the following composition is sprayed:

| | |
|---|---|
| epoxy resin Eurepox ® 756/67 (Schering) | 17 g |
| polyaminoamidio crosslinking agent XE 435 (Schering) | 14 g |
| water | 69 g |

After drying of the "primer" in the air for about 8 hours, the composition prepared according to this example is sprayed on the sample. It is possible to apply the composition up to a maximum thickness of about 300 μm of moist film for passage, without any sagging being noticed. After drying about two hours in the air it is possible to repaint the test piece; six/seven additional layers of the composition are then applied up to a total thickness of the dried film of about 900–1000 μm is achieved.

The cycle of drying and crosslinking comprises: drying at room temperature for 24 hours, drying at 60° C. for 5 hours, gradual rise of the temperature up to 120° C. and crosslinking at this temperature for 24 hours.

A part of the film is immersed in water at 60° C. and the weight variation accompanying the swelling in the time is measured: after 1 day 6%, after 3 days 11%, after 5 days 11%, after 15 days 13%.

EXAMPLE 8

The composition described in example 2 is applied on neoprene. The rubber is previously degreased with solvents (toluene and acetone) and then its surface is abraded.

On the so prepared rubber a "primer" having the following composition is sprayed:

| | |
|---|---|
| epoxy resin CHEM RES E 96 (Henkel) | 10 g |
| crosslinking REAMMIDE PGF 92 R 443 (Henkel) | 20 g |
| isopropyl alcohol | 30 g. |

After drying of the "primer" by stove at 60° C. for about 1 hour and 30 minutes, the composition described in Example 2 is sprayed on the sample, forming a moist film with a thickness of about 200 μm. The cycle of drying and crosslinking comprises: drying at room temperature for 12 hours, drying at 60° C. for 3 hours, gradual rise of the temperature up to 120° C. and crosslinking at this temperature for 24 hours.

Using a rubber sample so prepared the resistance of the coating to oil ASTM 5 is tested in comparison with the unpainted rubber: after 15 days the increase in weight of the painted test piece, due to swelling, is lower than 3% while the one of the unpainted rubber is about 40%.

EXAMPLE 9

(use of acrylic latex for comparison)

As comparison in relation to the formulation technique, an acrilic resin in aqueous emlusion is utilized for preparing the composition described hereinunder by microballs mill Fryma Maschinen AG, model MSM-12, the milling room of which has a capacity of about 500 ml.

The mill is let work continuously by milling about one kg of paint with a milling charge of about 300 ml formed by steatite small balls having a diameter of about 1–1.5 mm. The composition is obtained by contemporaneously adding all the components of the formulation:

| | |
|---|---|
| acrylic latex AC 33 (Rhom & Haas) | 400 g (100 phr) |
| polytetrafluoroethylene latex (69% by weight) | 37.0 g (6.1 phr) |
| kaolin (average size about 1.5 μm) | 67.9 g (14 phr) |
| zinc oxide | 36.6 g (7.5 phr) |
| carbon black | 14.7 g (3 phr) |
| silica ($S_{BET}$ 100 m$^2$/g) | 5.8 g (1.2 phr) |
| attapulgite ($S_{BET}$ 150 m$^2$/g) | 4.9 g (1 phr) |
| antifoam BYK 033 (Byk Chemie) | 8.2 g (1.7 phr) |
| water | 94.4 g |
| triethylenetetramine | 4.9 g (1 phr) |
| total solid | 65.4 % by wt. |

Two passages through the mill, with a stay time comprised between 2 and 5 minutes, are sufficient to obtain the highest degree of dispersion Heggman (about 5 μm) and a viscosity corresponding to 15" Ford Cup 4.

The described composition is applied on a sandblasted steel sheet, degreased with toluene and acetone, on which a "primer" having the following composition is sprayed:

| | |
|---|---|
| epoxy resin Eurepox ® 756/67 (Schering) | 17 g |
| polyaminoamidic crosslinking agent XE 435 (Schering) | 14 g |
| water | 69 g |

After drying of the "primer" in the air for about 8 hours, the above reported composition is spray applied. It is possible to apply, before sagging is noticed, a maximum thickness of about 150 μm of moist film for passage.

The composition is not stable in the time; the forming sediment caannot be dispersed any longer after about 20 days.

EXAMPLE 10

(use of PTFE latex for comparison)

As comparison in relation to the formulation technique, an aqueous emulsion of PTFE is utilized for preparing the composition described hereinunder by microballs mill Fryma Maschinen AG, model MSM-12, the milling room of which has a capacity of about 500 ml.

The mill is let work continuously by milling about 1 kg of paint with a milling charge of about 300 ml formed by steatite small balls having a diameter of about 1–1.5 mm. The composition is obtained by contemporaneously adding all the components of the formulation:

| | |
|---|---|
| polytetrafluoroethylene latex (69% by weight) | 400 g (100 phr) |
| kaolin (average size about 1.5 μm) | 67.9 g (14 phr) |
| zinc oxide | 36.6 g (7.5 phr) |
| carbon black | 14.7 g (3 phr) |
| silica ($S_{BET}$ 100 m$^2$/g) | 5.8 g (1.2 phr) |
| attapulgite ($S_{BET}$ 150 m$^2$/g) | 4.9 g (1 phr) |
| antifoam BYK 033 (Byk Chemie) | 8.2 g (1.7 phr) |
| water | 94.4 g |
| total solid | 65.4 % by wt. |

The latex coagulates during the milling process.

EXAMPLE 11

(use of PFA latex for comparison)

As comparison in relation to the formulation technique, an aqueous emulsion of PFA (not elastomeric tetrafluoroethylene copolymer with the perfluoro(propylvinylether)) for preparing the composition decribed hereinunder by microballs mill Fryma Maschinen AG, model MSM-12, is utilized, the milling room of which has a capacity of about 500 ml. The mill is let work continuously by milling about 1 kg of paint with a milling charge of about 300 ml formed by steatite small balls having a diameter of about 1–1.5 mm. The composition is obtained by contemporaneously adding all the components of the formulation:

| | |
|---|---|
| PFA latex (55% by weight) | 400 g (100 phr) |
| kaolin (average size about 1.5 μm) | 67.9 g (14 phr) |
| zinc oxide | 36.6 g (7.5 phr) |
| carbon black | 14.7 g (3 phr) |
| silica ($S_{BET}$ 100 m$^2$/g) | 5.8 g (1.2 phr) |
| attapulgite ($S_{BET}$ 150 m$^2$/g) | 4.9 g (1 phr) |
| antifoam BYK 033 (Byk Chemie) | 8.2 g (1.7 phr) |
| total solid | 65 % by weight. |

The latex coagulates during the milling process.

EXAMPLE 12

(use of vinyl latex for comparison)

As comparison in relation to the formulation technique, an aqueous emulsion of a vinyl resin is utilized for preparing the composition described hereinunder by microballs mill Fryma Maschinen AG, model MSM-12, the milling room of which has a capacity of about 500 ml.

The mill is let work continuously by milling about 1 kg of paint with a milling charge of about 300 ml formed by steatite small balls having a diameter of about 1–1.5 mm.

The composition is obtained by contemporaneously adding all the components of the formulation:

| | |
|---|---|
| Haloflex ® latex (ICI, 55% by weight) | 400 g (100 phr) |
| kaolin (average size about 1.5 μm) | 67.9 g (14 phr) |
| zinc oxide | 36.6 g (7.5 phr) |
| carbon black | 14.7 g (3 phr) |
| silica ($S_{BET}$ 100 m$^2$/g) | 5.8 g (1.2 phr) |
| attapulgite ($S_{BET}$ 150 m$^2$/g) | 4.9 g (1 phr) |
| antifoam BYK 033 (Byk Chemie) | 8.2 g (1.7 phr) |
| total solid | 65.4 % by wt. |

The latex coagulates during the milling process.

EXAMPLE 13

(composition crosslinkable at room temperature)

The concentrated dispersion of fluoroelastomer obtained with the procedure described in Example 2 is used for preparing the composition described hereinunder by means of a microballs mill Fryma Maschinen Ag. Mod. MSM-12, the milling room of which has a capacity of about 500 ml.

The mill is let work continuously by milling about 1 kg of paint with a milling charge of about 300 ml, formed by steatite small balls having a diameter of 1–1,5 mm. The composition is prepared by adding the following components at the same time and as such:

| | |
|---|---|
| fluoroelastomer latex (67% by weight) | 726.3 g (100 phr) |
| polytetrafluoroethylene latex (69% by weight) | 37.1 g (5.2 phr) |
| kaolin (average size about 1.5 μm) | 68.0 g (14 phr) |
| zinc oxide | 36.3 g (7.5 phr) |
| carbon black | 14.8 g (3 phr) |
| silica ($S_{BET}$ 100 m$^2$/g) | 8.7 g (1.8 phr) |
| attapulgite ($S_{BET}$ 150 m$^2$/g) | 7.3 g (1.5 phr) |
| antifoam BYK 033 (Byk Chemie) | 17.3 g (3.6 phr) |
| water | 86.9 g |
| p-bis (propylamino) piperazine (Koei Chem. Co.) | 10.0 g (2 phr). |

The total solid content is 66.9% by weight. Two passages through the mill, with a stay time between 2 and 5 minutes, are sufficient to obtain a dispersion at the highest degree Heggman (about 5 μm) having viscosity corresponding to 60" Ford Cup 4.

EXAMPLE 14

(crosslinking at room temperature)

On some sandblasted steel sheets, degreased with toluene and acetone, a "primer" having the following composition is sprayed:

| | |
|---|---|
| epoxy resin Eurepox ® 756/67 (Schering) | 17 g |
| polyaminoamidic crosslinking agent XE 435 (Schering) | 14 g |
| water | 69 g |

After drying of the "primer" in the air for about 8 hours, the composition described in Example 13 is sprayed on the samples. It is possible to apply the composition up to a maximum thickness of about 500 or more μm of moist film for passage, without any sagging being noticed. After about two hours three additional layers of the composition are then applied up to a total thickness of the dried film of about 900–1000 μm is achieved.

The steel sheets are then crosslinked at 25° C. for two weeks.

The chemical resistance properties of the film have been evaluated by exposition in cell AT-LAB (ASTM C868) to 96% sulphuric acid, to 37% hydrochloric acid and to toluene, respectively, keeping the temperature at 25° C.; in these conditions the test pieces are completely exposed to the liquid. The comparison between the adhesion properties before and after exposure is an indication of the barrier properties of the coating. After 30 days the adhesion is unchanged and no interlayer delamination is noticed.

The same composition is applied with the same modalities on a test piece of polished aluminium, degreased with toluene and acetone and crosslinked in the described conditions. The coating is then removed and characterized from the point of view of the crosslinking by means of swelling measurements in methylethyketone. The sample swelling has resulted scanty and since the methylethylketone is a good solvent of the polymer, such result is to be considered indicative of an advanced crosslinking level.

By comparing the behaviour of the sample in the treatment with methylethylketone with that of films crosslinked with triethylenetetramine at 120° C., a higher crosslinking level is noticed.

We claim:

1. Process for preparing concentrated and stable aqueous coating compositions based on fluoroelastomer, capable of giving a protective layer having high thickness without the formation of sagging after each application on the surface to be coated, said process comprising:

dispersing charges and a cross linking agent into a concentrated aqueous latex of fluoroelastomer by milling said components in their original physical form of dry powder or of liquid in said latex with a microball mill, said milling being carried out for such a time that the viscosity of the composition does not start to decrease, said aqueous latex having a fluoroelastomer concentration higher than 50% by weight with respect to the total weight of the latex and being formed of colloidal particles having less than 1 micron size.

2. Process according to claim 1 wherein the fluoroelastomer is in concentration comprised between 60% and 70% by weight with respect to the total weight of the latex.

3. Process according to claims 1 or 2, wherein the fluoroelastomer essentially consists in a terpolymer of vinylidene fluoride, hexafluoropropene and tetrafluoroethylene.

4. Process according to claims 1 or 2, wherein the fluoroelastomer utilized in the composition esentially consists in a terpolymer of vinylidenfluoride, hexafluoropropene and perfluoro(methylvinylether).

5. Process according to claims 1 or 2 wherein the fluoroelastomer utilized in the composition comprises by moles:

| |
|---|
| 4–75% of vinylidenfluoride units; |
| 12–40% of hexafluoropropene and/or perfluoro- (alkyl-vinylether) and/or perfluoro(alkoxy- alkylvinylether) and/or 1-hydro-pentafluoropropene and/or chlorotrifluoroethylene units; |
| 2–35% of units of an olefin containing up to 4 carbon atoms; |
| 2–60% of tetrafluoroethylene units. |

6. Process according to anyone of the claims from 1 or 2, wherein the crosslinking agent is a polyfunctional amine in an amount comprised between 1 and 10% with respect to the dry weight of the fluoroelastomer.

7. Process according to claim 6, wherein the polyfunctional amine is selected from polyethylenamines and polyetherdiamines.

8. Process according to claim 7 wherein the polyfunctional amine is selected from dipropylenetriamine, 1,4-bis-(aminopropyl)piperazine, alkylamines, isophoronediamine, meta-xylenediamine, polyoxypropylenetriamine and triethylenetetramine.

9. Process according to anyone of the claims from 1 or 2, wherein the crosslinking agent is a polyhydroxylated compound utilized in the presence of an aminophosphine accelerator.

10. Process according to anyone of the claims from 1 or 2 wherein the charges utilized are selected from the group formed by carbon black, clay, kaolin, silica, mica, talc, pigments or mixtures of these substances, in total amount comprised between 5 and 50% with respect to the dry weight of the fluoroelastomer.

11. Process according to anyone of the claims from 1 or 2, wherein it is used as charge polytetrafluoroethylene, which is mixed to the fluoroelastomer latex under the form of concentrated latex and in dry amount comprised between 1 and 10% with respect to the dry weight of the fluoroelastomer.

12. Process according to anyone of the claims from 1 or 2 wherein the aqueous latex of fluoroelastomer comes from the concentration of the dispersion obtained in the polymerization process, said concentration comprising:

(i) addition of a non-ionic surface active agent to the aqueous dispersion of the fluoroelastomer; (II) heating the dispersion to the temperature corrsponding to the surface active agent clouding; (iii) keeping the dispersion at said temperature for about one hour; (iv) decantation and separation of the concentrated phase below.

13. Coating compositions obtained by a process according to anyone of the claims from 1 or 2.

14. A method of making protective coatings of high thickness after only one passage on the surface to be coated, without sagging formation, using the coating compositions according to claim 13.

15. A method of impregnating fabrics with the coating compositions according to claim 13.

* * * * *